United States Patent [19]

Daniele

[11] Patent Number: 5,176,414
[45] Date of Patent: Jan. 5, 1993

[54] SNAP-ON BAYONET NUT COUPLING SLEEVE

[75] Inventor: Louis Daniele, Yonkers, N.Y.

[73] Assignee: Kings Electronics Co., Inc., Tuckahoe, N.Y.

[21] Appl. No.: 684,307

[22] Filed: Apr. 12, 1991

[51] Int. Cl.⁵ ............................................. F16L 39/00
[52] U.S. Cl. .................................. 285/321; 285/396; 285/402; 285/376
[58] Field of Search ............... 285/396, 376, 402, 387, 285/321

[56] References Cited

U.S. PATENT DOCUMENTS 3,637,239  1/1972  Daniel ............................. 285/321 X
3,773,360  11/1973  Timbers ........................... 285/321 X
4,133,564  1/1974  Sarcon et al. ..................... 285/321
4,138,146  2/1979  Rumble ........................... 285/321 X Primary Examiner—Michael F. Trettel
Attorney, Agent, or Firm—Jordan B. Bierman

[57] ABSTRACT

A bayonet nut coupler plug formed with a connector body and bayonet coupler, the connector body being provided with an undercut in which a spring or ring is retained. The bayonet coupling, which is provided with a recessed groove formed behind a lead chamfer, can be pushed over the assembly, thereby compressing the ring and snapping it onto the coupling undercut. By so forming the connector, the connector body can be attached to the bayonet coupling without requiring a forming overstep.

7 Claims, 3 Drawing Sheets

SNAP-ON BAYONET NUT COUPLING SLEEVE

The present invention is directed to a bayonet nut coupler and more specifically, to a bayonet nut coupler on which the sleeve can be attached by hand, and preferably, on an automatic assembler, without requiring a conventionally required form over operation. The invention is further directed to a bayonet nut coupler comprising less components than is the norm.

BACKGROUND OF THE INVENTION

A typical RF-type cable including coaxial, twinaxial, and triaxial cables comprises at least one inner conductive wire, a surrounding conductor (braid), a dielectric insulating layer disposed between the conductor and the braid, and an outer insulating jacket. Such cables are usually connected to devices using connector assemblies crimped or soldered onto the cable end. The common cable connector comprises a clamp nut, a connector body and a bayonet sleeve. The cable, having a contact crimped or soldered onto the center conductor is fed throught the clamp nut, onto which the body assembly is screwed. A spring washer and half washer, also called a cam lever, are supplied over the forward end of the body assembly, the bayonet sleeve is slid over the washer and cam lever, and the back end of the bayonet sleeve is formed over the cam lever and washer to rotatably attach the bayonet sleeve to the body assembly. The above arrangement was found to be disadvantageous, however, as the small, and easily lost washer and cam lever were necessary and, as the bayonet sleeve end had to be formed over the washer, a tool was required. Further, this operation is not easily conducted on automated machinery.

BRIEF DESCRIPTION OF THE INVENTION

In view of the above, it is an object of the present invention to provide a bayonet nut coupler which can be assembled by hand, without tools, or on automated manufacturing equipment.

It is a another object of the invention to reduce the number of parts necessary to form the coupling device. The inventive device is simple, inexpensive and, due to its unique configuration, allows for easy assembly by hand or by automated processing equipment, while comprising fewer small parts than the standard bayonet nut coupler.

Other objects and features of the present invention will become apparent from the following detailed description considered in conjunction with the accompanying drawings.

BRIEF DESCRIPTION OF THE DRAWINGS

FIG. 5 is a side view of a second embodiment of the inventive bayonet nut coupler plug.

DETAILED DESCRIPTION OF THE INVENTION

Figure 1:
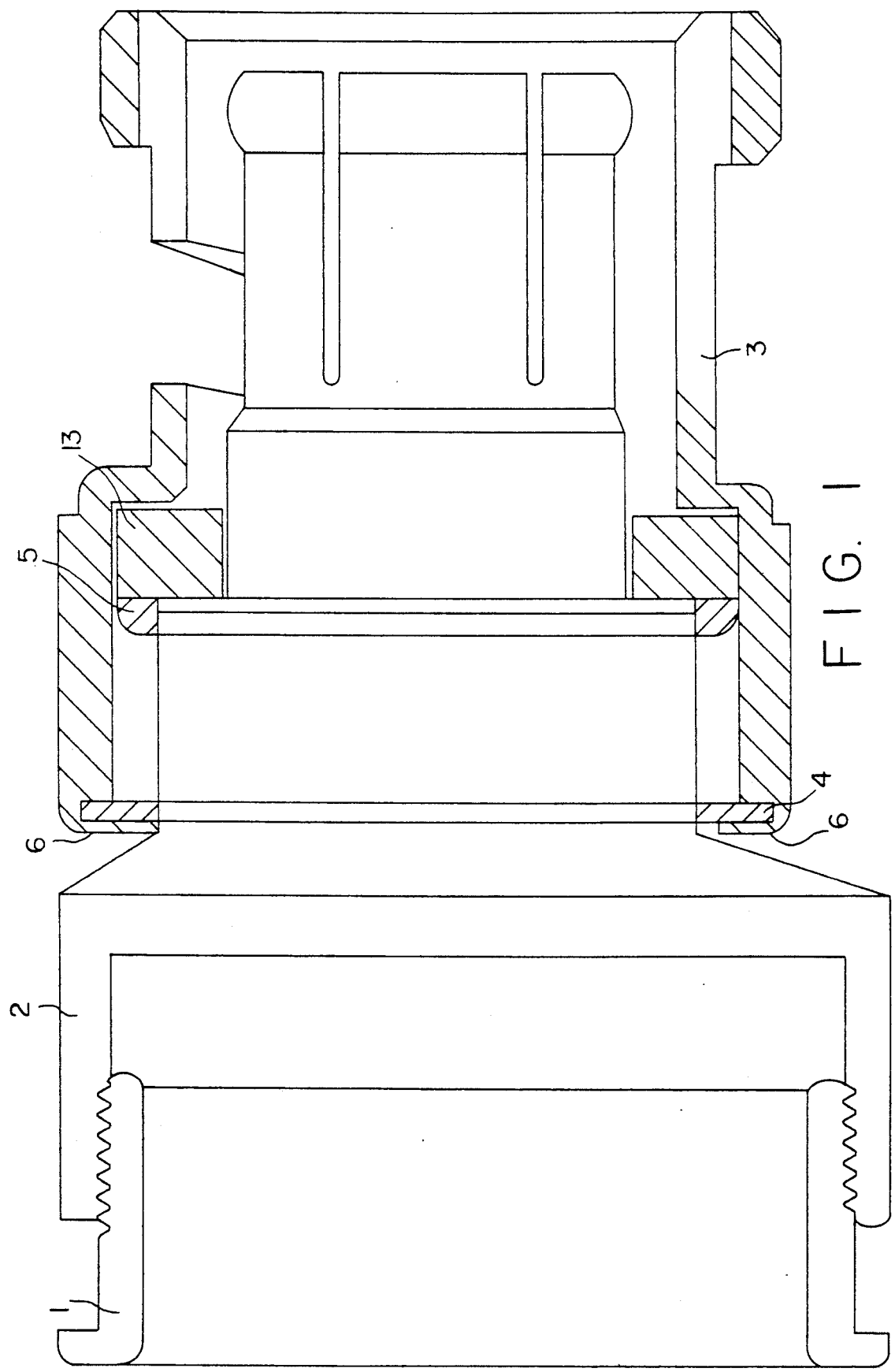
FIG. 1 is a side view of a standard prior art bayonet nut coupler plug assembly.

Referring to FIG. 1, there is shown a common prior art-type bayonet nut coupler (BNC) plug. These prior art couplers comprise clamp nut 1, body assembly 2, and bayonet sleeve 3. To cable these couplers, a coaxial cable having a contact crimped or soldered to the center connector thereof (not shown), is threaded through clamp nut 1, onto which body assembly 2 is threaded. Half washer 4 (also known as a cam lever) and spring washer 5 is disposed over the front end of the body assembly, bayonet sleeve 3 is slid over half washer 4 and the back end of bayonet sleeve 3 is formed over half washer 4 to rotatably captivate bayonet sleeve 3 on body assembly 2. Because the back end of bayonet sleeve 3 must be formed over 6 half washer 4, a forming over dye must be used to insure the proper attachment of bayonet sleeve 3. Further, before bayonet sleeve 3 is attached, half washer 4 and spring washer 5 are free to slip off body assembly 2 and be lost. Thus, prior art BNC plugs could not be hand assembled, or assembled on high speed automated machinery and, oftentimes, the small, non-captive parts thereof are lost before assembly.

Figure 2:
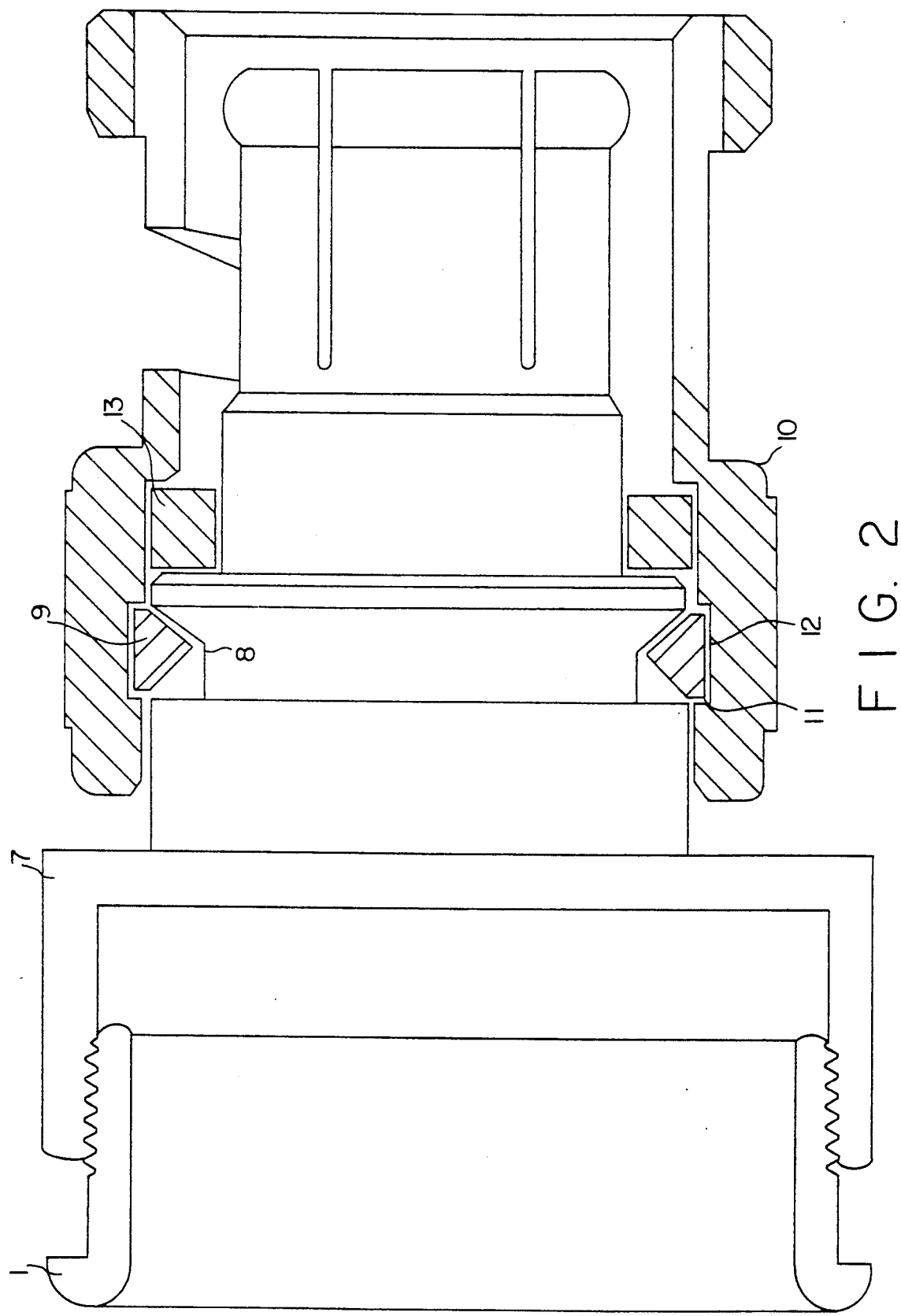
FIG. 2 is a side view of a first embodiment of the inventive bayonet nut coupler plug.

In order to solve the shortcomings of the above-described prior art bayonet nut coupler plugs, the invention (as shown in FIG. 2) comprises connector body 7, the front end of which is formed with V-shaped undercut 8 in which triangular split ring 9 is retained. Advantageously, split ring 9 is formed of beryllium copper. Bayonet coupling 10 is formed with integral lead chamfer 11 with recessed groove 12 formed behind it. Bayonet coupling 10 is pushed over connector body 7, lead chamfer 11 compressing triangular split ring 9 until it becomes captivated between undercut 8 and recessed groove 12, thereby rotatably locking bayonet coupling 10 onto connector body 7. Gasket 13 is provided within bayonet coupling 10 in order to provide a watertight seal.

Figure 3:
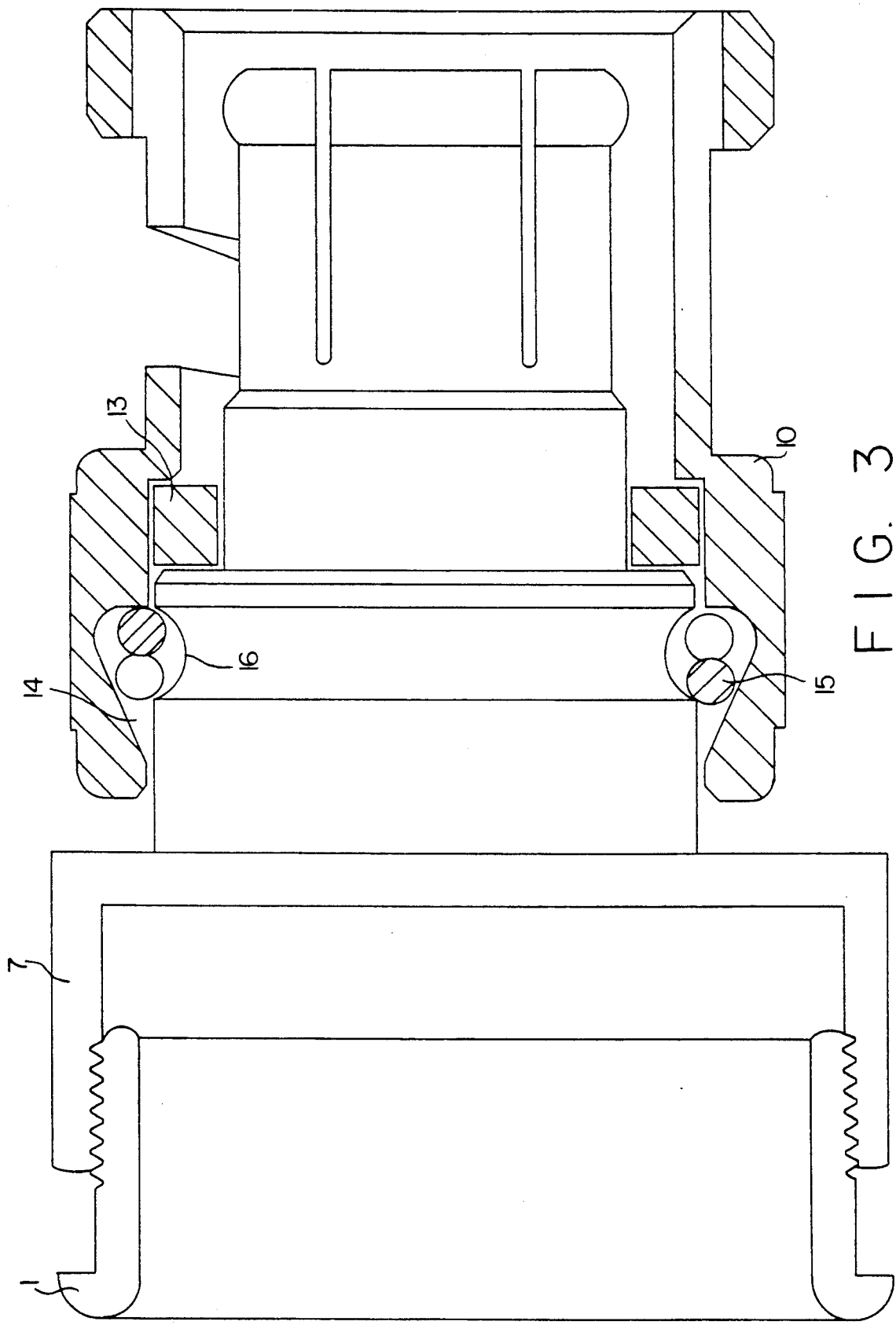

In a second embodiment of the invention (shown in FIG. 3) bayonet coupling 10 is formed with an internal cone-shaped or ramped undercut 14 in which a round, waved spring wire 15 is retained. Connector body 7 is provided with groove 16; connector body 7 being pushed into bayonet coupling 10, depressing the spring along the undercut at which time springwire 15 snaps into undercut 14, thus locking bayonet coupling 10 into place on connector body 7. The combination of cone-shaped undercut 14 and waved spring wire 15 serve a dual purpose; retaining bayonet coupling 10 on connector body 7, and providing a constant spring tension against gasket 13, which compresses against the connector body 7.

While only the fundamental novel features of the invention as applied to a preferred embodiment thereof have been shown and described, it is understood that various omissions, substitutions, and changes in the form and details of the device illustrated and in its operation may be made by those skilled in the art without departing from the spirit of the invention. It is therefore the intention of Applicant that the invention be limited only as indicated by the scope of the claims appended hereto.

I claim:

1. A quick connect and disconnect bayonet coupling nut electrical connector, said electrical connector comprising a connector body and bayonet coupling, said bayonet coupling being adapted to push axially onto said connector body and lock into a recess formed therein, said bayonet coupling remaining free to rotate around said connector body after connection, said bayonet coupling being formed with an internal undercut ramp in which a round, waved spring wire is retained and said connector body is formed with a groove, whereby, when said connector body is axially pushed into said coupling. said spring is forced along said undercut releasing tension as a diameter of said undercut increases, thereby locking said connector body onto said bayonet coupling.

2. The bayonet nut coupler plug of claim 1 wherein said undercut is cone-shaped.

3. The bayonet nut coupler plug of claim 1 wherein said undercut is ramp-shaped.

4. The bayonet nut coupler plug of claim 1 wherein a gasket is provided in said bayonet coupling, said waved spring wire providing spring tension compressing said gasket against a face of said connector body, thereby maintaining a watertight seal.

5. A quick connect and disconnect, bayonet coupling nut electrical connector, said electrical connector comprising a connector body and bayonet coupling, said bayonet coupling being adapted to push axially onto said connector body and lock into a recess formed therein, said bayonet coupling remaining free to rotate around said connector body after connection.

said recess comprising a cone-shaped undercut in which a triangular split ring is retained, said bayonet coupling having a lead chamfer with a rectangular recessed groove formed behind said lead chamfer, whereby, when said bayonet coupling is pushed onto said connector body, said lead chamfer compresses said ring until said ring aligns with said recessed groove, said triangular split ring axially locking said bayonet coupling to said connector body.

6. The bayonet nut coupler plug of claim 5 wherein said triangular split ring is formed of beryllium copper.

7. The bayonet nut coupler plug of claim 6 wherein a gasket is provided in said bayonet coupling, said split ring maintaining a tension which compresses said gasket against a face of said connector body to provide a waterproof seal.

* * * * *